US005137253A

United States Patent [19]

Frey et al.

[11] Patent Number: 5,137,253

[45] Date of Patent: Aug. 11, 1992

[54] ACTUATOR

[75] Inventors: Heinz Frey, Menziken; Kamil Prochazka, Windisch, both of Switzerland

[73] Assignee: Asea Brown Boveri Ltd., Baden, Switzerland

[21] Appl. No.: 610,764

[22] Filed: Nov. 8, 1990

[30] Foreign Application Priority Data

Dec. 1, 1989 [CH] Switzerland ..................... 4315/89-3

[51] Int. Cl.⁵ .................... F16K 31/124; F16K 31/42; F15B 13/16

[52] U.S. Cl. ....................................... 251/29; 91/361; 91/459; 251/30.02

[58] Field of Search ................. 91/361, 388, 459, 461; 251/25, 26, 28, 29, 30.01, 44, 57, 63.5, 63.6, 30.02

[56] References Cited

U.S. PATENT DOCUMENTS

| | | | |
|---|---|---|---|
| 3,495,501 | 2/1970 | Kure-Jensen . | |
| 3,948,478 | 4/1976 | Vind | 251/29 |
| 4,043,533 | 8/1977 | Cowley | 251/57 |
| 4,149,565 | 4/1979 | Jennings et al. | 251/44 |
| 4,215,844 | 8/1980 | Bowen | 251/28 |
| 4,311,296 | 1/1982 | Scheffel | 251/29 |
| 4,335,867 | 6/1982 | Bihlmaier | 251/28 |
| 4,589,444 | 5/1986 | Masek et al. | 251/25 |
| 4,637,587 | 1/1987 | Kuhnlein | 251/29 |

FOREIGN PATENT DOCUMENTS

| | | |
|---|---|---|
| 0127027 | 12/1984 | European Pat. Off. . |
| 285195 | 6/1915 | Fed. Rep. of Germany . |
| 519057 | 2/1931 | Fed. Rep. of Germany . |
| 1257158 | 12/1967 | Fed. Rep. of Germany . |
| 3432890 | 1/1986 | Fed. Rep. of Germany . |
| 1156683 | 12/1957 | France . |

*Primary Examiner*—George L. Walton
*Attorney, Agent, or Firm*—Oblon, Spivak, McClelland, Maier & Neustadt

[57] ABSTRACT

An actuator for a control valve with a control circuit has a main piston which slides in a main cylinder. On one side of the main piston, there is arranged a drive volume, which can be pressurized with oil in a controlled manner, on the other side of which there is arranged an oil-filled buffer volume. The actuator despite having a greater capacity, has a comparatively high dynamic performance which has positive effects particularly when closing the control valve. This is achieved in that the drive volume and the buffer volume can be connected through a connecting line which can be sealed off by a valve. This valve is activated directly hydraulically via a second valve.

10 Claims, 2 Drawing Sheets

ACTUATOR

BACKGROUND OF THE INVENTION

1. Field of the invention

The invention is based on an actuator for a control valve having a control circuit which sets the actuator in accordance with the reference value predetermined by a master system control, having a main piston which slides in a main cylinder, having a drive volume, which can be pressurized with oil in a controlled manner, on one side of the main piston and having an oil-filled buffer volume on the other side of the main piston.

2. Discussion of background

An actuator for the activation of a control valve with which, for example, the steam supply to a turbine of a power station system can be controlled, has a main piston which on the one hand is impinged on by spring force, and on the other hand pressurized with oil. Given falling pressure of the oil, the spring force reliably closes the control valve, as a result of which the steam supply is disconnected. By this means, it is ensured that the turbine does not get out of control if the pressure of the oil should happen to drop. The oil pressure in a drive volume which acts on the main piston and activates the control valve via the piston is generated by an electro-hydraulic transducer. Given a movement of the control valve in the direction of opening, oil under pressure is fed into the drive volume, however since this movement occurs relatively slowly, comparatively small cross-sections are sufficient for the feeding of the oil. However, a closing movement of the control valve has to occur at a speed which is approximately ten times higher. This requires a comparatively rapid emptying of the drive volume which, however, cannot be achieved through the small cross-sections of the oil feed.

In addition, it is clear that, due to the increase in turbine power, the control valves and thus also the actuators which activate them have to be of larger and stronger design. A corresponding proportional enlargement of actuators leads to arrangements with comparatively large amounts of oil under pressure for their activation. With commercially available valves, quantities of oil of this kind can only be controlled with difficulty, in addition the dynamic performance of the actuator also suffers with increasing size.

SUMMARY OF THE INVENTION

Accordingly, one object of the invention is to provide a remedy for this. The invention, as characterized in the claims, fulfils the task of providing an actuator for a control valve which, despite its larger capacity, has a comparatively high dynamic performance which has positive effects particularly when closing the control valve.

The advantages achieved by means of the invention are to be seen essentially in the fact that the actuator can be constructed in a comparatively simple and operationally reliable manner.

The further embodiments of the invention are subjects of the dependent claims.

The invention, its further development and the advantages achievable therewith are explained in greater detail below with reference to the drawing which merely illustrates one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

In all the figures, elements operating in the same way are provided with identical reference symbols.

DESCRIPTION OF THE PREFERRED EMBODIMENTS

Figure 1:
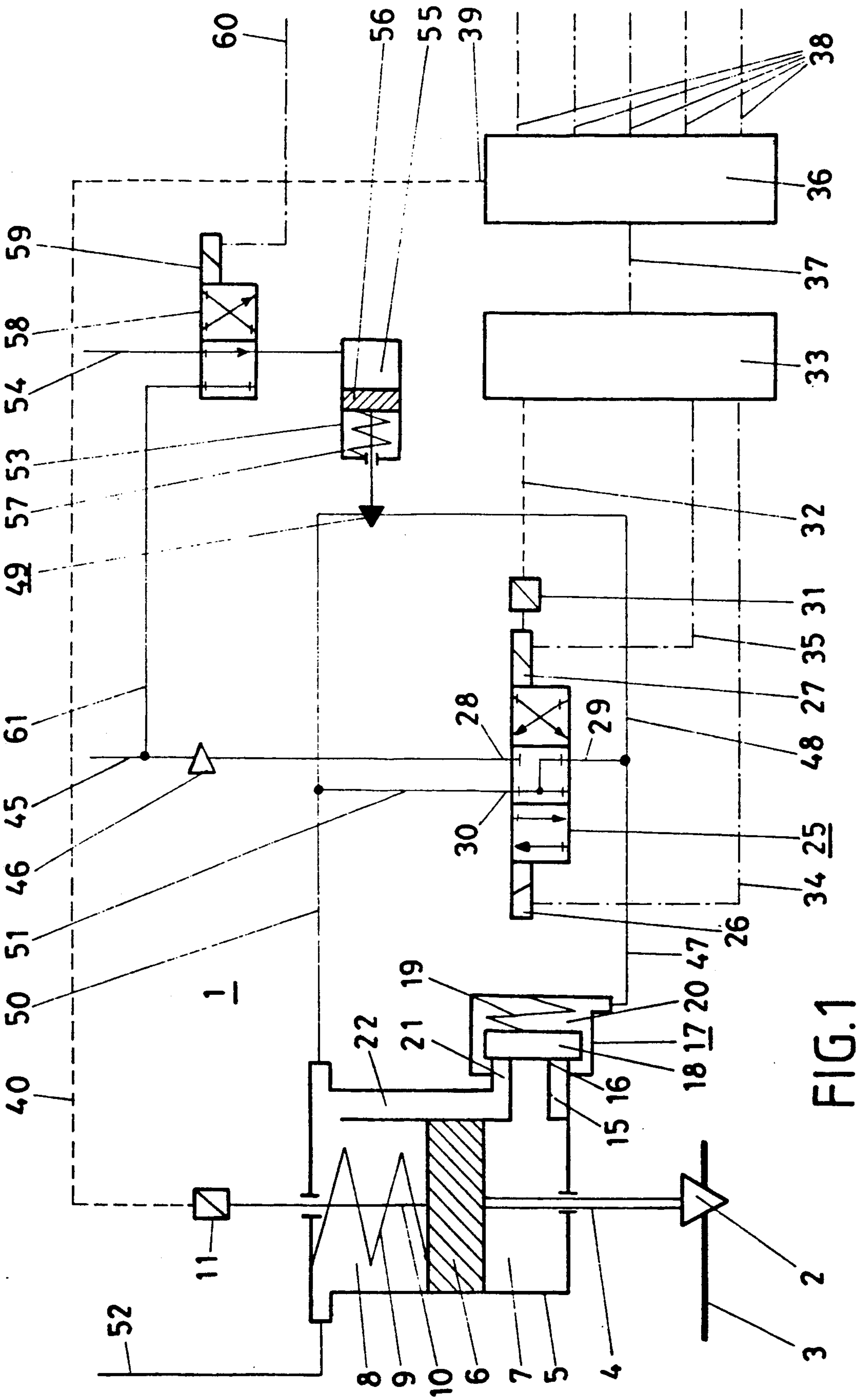
FIG. 1 shows a basic outline of an actuator according to the invention.

Referring now to the drawings, wherein like reference numerals designate identical or corresponding parts throughout the several views, FIG. 1 shows an actuator 1 which activates a control valve 2 which controls the quantity of superheated steam flowing through a superheated steam line 3 to a turbine (not shown). The control valve 2 is connected by means of a valve spindle 4 to a main piston 6 which slides in a main cylinder 5. Below the main piston 6, a drive volume 7 which can be pressurized with oil is arranged. Instead of the oil, a different hydraulic fluid or a gaseous medium may also be provided. Above the main piston 6, an oil-filled buffer volume 8 is provided in which a spring 9 which counteracts the oil pressure in the drive volume 7 is additionally arranged. On the main piston 6 on the spring side, a rod 10 is provided which connects the main piston 6 to a position measuring device 11. The rod 10 and the valve spindle 4 penetrate the main cylinder 5 on opposite sides. The constructional realization of these pressure-tight penetrations is known and does not need to be described further here.

On the main cylinder 5 in the region of the drive volume 7 there is a tubular connecting piece 15 whose end 16 facing away from the main cylinder 5 is constructed as a seal seat. This end 16 is terminated by a plate valve 17 (shown in simplified form). A plate 18 is pressed by a pressure spring 19 against the end 16. The pressure spring 19 is arranged in a spring space 20 pressurized with oil. Near to the end 16 of the tubular connecting piece 15, the plate 18 is sealed simultaneously pressure-tightly by a volume 21 which concentrically surrounds the connecting piece 15 and which is continuous with a comparatively short, direct connecting line 22 which leads along the main cylinder 5 into the buffer volume 8. This connecting line 22 has a comparatively large cross-section. The spring space 20 is designed, according to the order of magnitude, to be approximately one thousand times smaller than the drive volume 7 with which it has an operative connection. The spring space 20 is additionally operatively connected to a proportional directional control valve 25.

The proportional directional control valve 25 used can be, for example, the directly activated proportional directional control valve with positioning control of the type KFDG 4V - 3/5, series 20, from the Company Vickers Systems GmbH, D 6380 Bad Homburg v.d.H. The proportional directional control valve 25 has two activation magnets 26, 27 which cooperate with return springs (not shown), and in this case have three hydraulic connections 28, 29, 30. In FIG. 1, the proportional directional control valve 25 is illustrated in the so-called "fail-safe" position. The proportional directional control valve 25 has a stroke measuring device 31 connected to the slide of the valve, which stroke measuring device 31 measures the respective position of the slide and, as indicated by an action line 32, passes on this information in a position controller 33 with integrated power amplifier. The activating magnets 26, 27 receive, as indicated by action lines 34, 35, their commands from this position controller 33 with integrated power amplifier. The position controller 33 used can be, for example, a power amplifier EEA-PAM-533-A, series 20, from the Company Vickers Systems GmbH, D 6380 Bad Homburg v.d.H., especially tuned to the proportional directional control valve 25. This position controller 33 cooperates with a master controller 36 as is indicated by an action line 37. The controller 36 has further inputs 38 through which information and commands are fed in from a master system control which controls the entire power station system. Furthermore, it has an input 39 for feeding in, as indicated by an action line 40, electrical signals supplied by the position measuring device 11.

Oil is fed in under pressure through a line 45, the necessary oil pressure is generated by a pump (not shown). The through-flow rate of the oil is limited to a maximum quantity by means of an orifice plate 46 arranged in the course of the line 45. This orifice plate 46 can have a constant or an adjustable cross-section. The line 45 leads to the port 28 of the proportional directional control valve 25 which in the illustration in FIG. 1 is not through-connected to the port 29. The port 29 is connected on the one hand to a line 47 which leads into the spring space 20 of the plate valve 17 and on the other hand to a line 48 which leads to a safety valve 49 which is normally closed and designed as plate valve. After the safety valve 49, a line 50 leads into the buffer volume 8 of the main cylinder 5. A line 51 branches off from the line 50 and constitutes the connection to the port 30 of the proportional directional control valve 25. A line 52 leads from the buffer volume 8 to a discharge device (not shown). The oil passes from this discharge device on through the aforesaid pump and back into the line 45.

The safety valve 49 is designed as a plate valve having a cylinder 53, a volume 55 which is fed through a line 54 with oil under pressure from a safety oil circuit, the volume 55 being limited by a valve plate 56 and by means of a valve spring 57 which counteracts the oil pressure acting on the valve plate 56. From the diagrammatic representation of the safety valve 49 is not clear that the valve plate 56 is designed in such a way that it is impossible for it to become jammed. The line 54 leads normally through a directional control valve 58. The directional control valve is activated by an electromagnet 59. An action line 60 indicates the path of the trigger command for the electromagnet 59. For safety reasons, this trigger command is usually interlocked with the master system control, so that no undesired mistriggerings can occur. A line 61 which branches off from the line 45 leads to the directional control valve 58. Via this line, the oil pressure from the line 45 can be fed to the volume 55 after a switching over of the directional control valve 58 and the safety line 49 can be kept closed, if, for example, the safety oil circuit is unpressurized.

It is particularly advantageous with respect to an increased dynamic performance of the actuator if the proportional directional control valve 25 is connected to the plate valve 17 and the main cylinder 5 to form a monolithic unit. The lines 47 and 48 can be made comparatively short in this case, just like the lines 50 and 51, so that the oil-filled line volumes can be correspondingly small, which increases the dynamic performance. However, it is also possible to provide, instead of the plate valve 17, one or more other valves if this seems desirable in view of the operating requirements which are placed on the actuator 1.

Likewise, it is possible to replace the proportional directional control valve 25 by at least one electrohydraulic valve or by a combination of different electrohydraulic valves, in order to match the actuator or its dynamic behavior to the predetermined operating conditions. Accordingly, the actuator can be used in a large variety of ways.

The cooperation of the position controller 33 with integrated power amplifier and of the controller 36 as a common electronic control arrangement of a control circuit is therefore particularly advantageous since the position controller 33 is specially matched to the proportional directional control valve 25, so that no additional matchings and adjustments are necessary. It is however always possible to compose this electronic control arrangement from other elements or to transfer its function to a master system control if, for example, the protection concept of the power station system required this. In the electronic control arrangement, signals originating from the position measuring device 11 and from the stroke measuring device 31 are continuously processed together with at least one reference value, predetermined by the master system control, according to a predetermined logic. In the event of deviations from this reference value, this control arrangement generates correction signals which act on the activation magnets 26, 27 of the proportional directional control valve 25 and bring about a corresponding change-over of the same.

Figure 2:
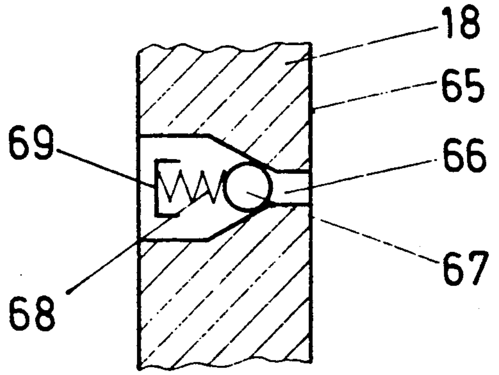
FIG. 2 shows a first embodiment of a detail of a plate valve.

In FIG. 2, a part of the plate 18 of the plate valve 17 is diagrammatically represented in section. The spring space-side face 65 of the plate 18 is arranged on the right; this also applies to the following figures. A hole through the plate 18 has a cylindrical orifice 66 which is adjoined by a conical extension. A sphere 67 is pressed into this conical extension by a spring 68 which is supported against a bracket 69 connected to the plate 18, and closes the orifice 66. Through the orifice 66, oil can flow under pressure into the drive volume 7 as soon as a pressure difference occurs which is large enough to overcome the force of the spring 68 and the oil pressure acting on the sphere 67.

Figure 3:
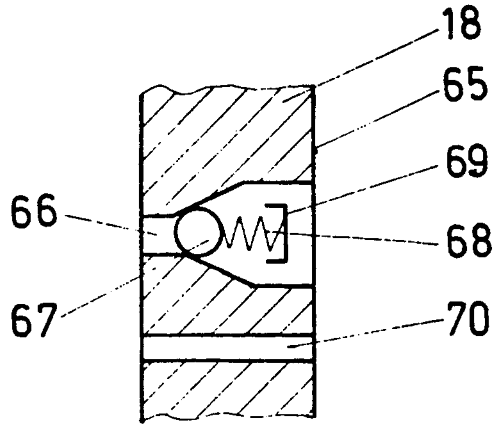
FIG. 3 shows a second embodiment of a detail of a plate valve.

FIG. 3 is similar to FIG. 2 except that in this case a hole with the orifice 66 through the plate 18 is formed in such a way that oil can flow from the drive volume 7 into the spring space 20. In addition, a rigid orifice plate 70 is present which permits an oil flow in both directions. The cross-section of the orifice plate 70 is substantially smaller here than that of the orifice 66.

Figure 4:
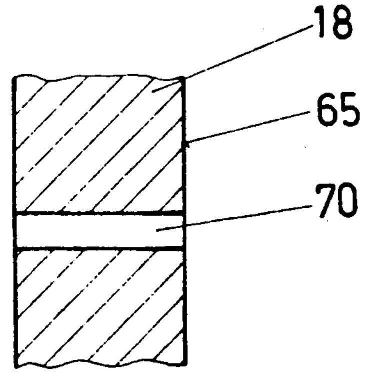
FIG. 4 shows a third embodiment of a detail of a plate valve.

It is, of course, also possible, as FIG. 4 shows, merely to insert a rigid orifice plate 70 into the plate 18 as a hole and to limit the passage of oil by this means.

Figure 5:
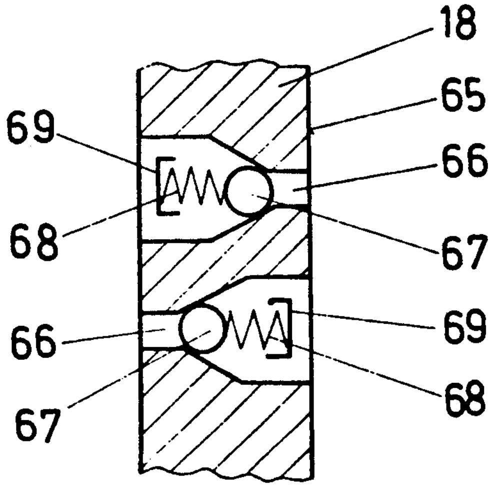
FIG. 5 shows a fourth embodiment of a detail of a plate valve.

FIG. 5 shows a plate 18 with two valve arrangements, illustrated similarly to FIG. 2, which, however, permit a passage of oil in opposite directions in the case of corresponding pressure difference. The orifice 66 which leads from the drive volume 7 into the spring space 20 has a substantially larger cross-section than the second orifice 66.

In order to explain the mode of operation, FIG. 1 will be considered in greater detail. The control valve 2 must be able to be closed comparatively rapidly in operation. The closing speed is normally in the region of 1 m/sec, whereas merely speeds in the region of 0.02 m/sec are required as opening speed. These speeds are recommended values, depending on the design of the power station system considerable deviations from these specifications may also occur. The actuator 1 can be matched to the respective operating conditions with comparatively little outlay.

If the control valve 2 is to be moved in the opening direction, the proportional directional control valve 25 is activated by the position controller 33, and, to be precise, it is actuated in such a way that the diagram to the left of the indicated position applies. The ports 28 to 29 are then connected trough and oil under pressure flows from the line 45 through the proportional directional control valve 25. In normal operation, no oil can flow through the line 48 since the safety valve 49 shuts off this line 48. The oil flows through the line 47 into the spring space 20 of the plate valve 17 and from there on through the opening of the plate 18 and the connecting piece 15 into the drive volume. The oil pressure in the drive volume 7 moves the main piston 6 upwards and thus moves the control valve 2 in the opening direction via the valve spindle 4. The position measuring device 11 monitors the stroke of the main piston 6 and reports its position continuously to the controller 36. As soon as the predetermined reference value of the stroke is reached, the controller 36 closes the proportional directional control valve 25 via the position controller 33 in such a way that the oil flow is interrupted. The stroke measurement 31 whose signals are processed in the position controller 33 monitors the operating behavior of the proportional directional control valve 25. The movement of the main piston 6 is terminated at the same time as this closing.

If, on the other hand, the control valve 2 is quickly transferred from its open position into a closed state, the proportional directional control valve 25 is repositioned in such a way that the diagram to the right of the indicated position applies. The ports 29 and 30 are connected to one another and oil flows from the spring space 20 through the line 47, on through the proportional directional control valve 25, through the lines 51 and 50 and through the buffer volume 8 and the line 52 into the discharge device. However, this flow process only lasts for a very short time since as soon as the pressure in the spring space is smaller than the pressure in the drive volume 7, the plate 18 moves to the right counter to the pressure of the spring 19, and the oil can flow from the drive volume 7 through the volume 21 and the connecting line 22 into the buffer volume 8 filled with oil under low pressure, and from there on into the discharge device. The spring 9 presses the main piston 6 downwards and thus forces the oil out of the drive volume 7 into the buffer volume 8 until the final position of the control valve 2 is reached. The flowing out of the oil occurs very rapidly since the cross-section released by the plate valve 17 and also the cross-section of the direct connecting line 22 are comparatively large and cannot negatively influence the flow process. By means of the movement of the main piston 6, suction arises in the buffer volume 8 and additionally supports this oil flow and increases the dynamic performance of the actuator 1.

Such a rapid pressure release of the drive volume 7 and such a rapid flowing out of the oil from the same would be impossible through the comparatively small cross-sections of the lines 47, 51 and 50. If these cross-sections and the proportional directional control valve 25 were correspondingly enlarged, a dynamic performance of the actuator 1 would be obtained, due to the large oil quantities to be moved over comparatively large distances, which would not be nearly as good as that achieved with the embodiment according to the invention.

Only a comparatively small quantity of oil under pressure is required to pressurize the spring space 20 which is very small in comparison to the drive volume 7. The pressure in this spring space 20 is therefore also released very quickly through the lines 47, 51 and 50 if a corresponding control command arrives at the proportional directional control valve 25. This results in the plate valve 17 opening already directly after the control command and initiating the rapid closing movement of the main piston 6 and thus of the control valve 2. The volume of the lines 47, 51, 50 accordingly does not negatively influence the dynamic performance of the actuator or only to a very small extent.

In normal operation, small deviations from the reference value are detected by the controller 36 and corresponding correction signals are transmitted via the position controller 33 to the proportional directional control valve 25. If the control valve 2 should still open to a certain extent, only a small quantity of oil under pressure is subsequently fed into the drive volume 7 until the reference value is reached again. The at least one hole through the plate 18 as diagrammatically illustrated in FIG. 2 by the orifice 66, in FIG. 3 and FIG. 4 by the orifice plate 70 and in FIG. 5 by the upper orifice 66 is sufficient for opening movements of the control valve. If the plate 18 is designed according to FIG. 2, the closing movement of the control valve is initiated, as already described, by a dropping of the oil pressure in the spring space 20, whereupon, if only a small stroke is to be made in the closing direction, the plate valve 17 opens for only a short time and allows oil to escape through the connecting line 22 into the buffer volume 8. As soon as the reference value is reached, the plate valve 17 closes again immediately.

In the embodiment of the plate 18 according to FIG. 3, relatively small closing movements can take place without the plate valve 17 opening, since oil can flow out of the drive volume 7 into the spring space 20 through the orifice 66 and through the orifice plate 70 until a pressure compensation is produced, as soon as the reference value is reached. If, in this case, relatively large reference value deviations are to be compensated, the plate valve 17 also opens for a short time if the cross-sections of the orifice 66 and of the orifice plate 70 are not sufficient. The procedure of the closing process occurs in the embodiment according to FIG. 4 similarly to that in FIG. 3.

The embodiment of the plate 18 according to FIG. 5 also permits a small closing movement, an opening of the plate valve 17 is necessary also in this case for relatively large strokes of the main piston 6.

The proportional directional control valve 25 is illustrated in FIG. 1 in the central position. This position is assumed if, for example, the activation magnets 26, 27 receive no voltage because of a mains failure. The reaching of this position is ensured under all circumstances by spring force of springs provided inside the proportional directional control valve 25. In this position, the pressure in the spring space 20 is relieved through the lines 47, 51 and 50 so that the plate valve 17 opens, which as already described leads to a rapid closing of the control valve 2. In this way, it is ensured that the control valve 2 is always definitely closed in the event of a fault, so that under no circumstances can damage occur to the turbine in operation as a result of a defect in the actuator 1.

Normally, the safety valve 49 prevents a pressure drop in the line 48 in the direction of the discharge device. However, if the pressure in the safety oil circuit drops, the pressure in the volume 55 also drops and the safety valve 49 releases the line 48 irrespective of the position of the proportional directional control valve 25, so that the pressure can escape from the spring space 20 of the plate valve 17 via the lines 47, 48 and 50, as a result of which, as already described, a rapid closing process of the control valve 2 is initiated. In every case, a reliable blocking of the steam supply to the turbine can also be achieved by means of this measure.

During attempts at putting into service, it can occur that the safety oil circuit is not yet under pressure, or cannot yet be put under pressure. The directional control valve 58 is installed for this case, the directional control valve 58 making it possible, as soon as electromagnet changing over to the diagram illustrated to the right of the indicated position occurs, that oil under pressure can be fed to the volume 55 from the line 45 through the line 61 and through the directional control valve 58, as a result of which the safety valve 49 is closed. The command path for the directional control valve 58, as indicated by the action line 60, must, however, be blocked as soon as changing over to normal mode occurs, since otherwise it is no longer possible for the safety oil circuit to act on the safety valve 49, so that the protective function of this circuit would no longer be ensured.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An actuator for a control valve comprising:

control circuit means for setting the actuator in accordance with a reference value predetermined by a master system control;

a main piston which slides in a main cylinder, said main piston being operatively connected to said control valve and being movable between an open and closed position of said control valve as a function of said control circuit means, the main cylinder having a drive volume on one side of the main piston which can be pressurized with oil in a controlled manner for opening the control valve, and an oil-filled buffer volume on the other side of the main piston for closing the control valve;

connecting line means for connecting the drive volume and the buffer volume; and at least one pilot valve means for sealing off said connecting line means and the connection between the drive volume and the buffer volume by sitting on a valve seat, said at least one pilot valve means being directly hydraulically actuable by at least one controlled valve means, said at least one pilot valve means being constructed as a plate valve comprising a plate which can be impinged in a closing direction toward said valve seat by a pressure spring arranged in a spring space, said plate comprising at least one hole for permitting cooperation of oil under pressure in the spring space and oil in the drive volume and enabling a small closing movement of said main piston which causes the control valve to move a proportional amount in a closing direction by permitting oil to flow out of said drive volume to said spring space through said at least one hole without moving said plate from said valve seat so that said oil can be discharged through said controlled valve to a reservoir means, and permitting a small opening movement of said main piston which causes said control valve to move a proportional amount in an opening direction by permitting oil to flow from said spring space to said drive volume through said at least one hole.

2. The actuator as claimed in claim 1, wherein the spring space has a volume which, according to an order of magnitude, is approximately one thousand times smaller than the drive volume.

3. The actuator as claimed in claim 1, wherein the at least one hole through the plate is constructed as a rigid orifice plate or as a valve arrangement which has an identical or a different through-flow cross-section in both directions.

4. The actuator as claimed in claim 1, wherein the at least one hole through the plate is constructed as a third valve which permits a flow of oil into the drive volume.

5. The actuator as claimed in claim 1, wherein the at least one hole through the plate has a rigid orifice plate and additionally a fourth valve which permits a flow of oil out of the drive volume.

6. The actuator as claimed in one of claims 1, 2, 3, 4 or 5, wherein the at least one controlled valve means is constructed as a electrohydraulic proportional directional control valve having at least one activation magnet and one stroke measuring device.

7. The actuator as claimed in claim 6, wherein the proportional directional control valve is connected to the plate valve and the main cylinder to form a monolithic unit.

8. The actuator as claimed in claim 6, wherein an electronic control arrangement is provided in the control circuit means, wherein signals originating from a position measuring device for monitoring a stroke of the main piston and from the stroke measuring device are continuously processed together with the respective predetermined reference value according to a predetermined logic, and wherein this control arrangement generates, in the event of reference value deviations, correction signals which excite the activation magnets.

9. The actuator as claimed in claim 8, wherein the electronic control arrangement comprises a position controller with an integrated power amplifier, and a controller which cooperates with the position controller, and wherein the signal originating from the stroke measuring device is fed into the controller and the signal originating from the position measuring device is fed into the position controller.

10. The actuator as claimed in claim 9, wherein, in the event of a fault, the closing of the control valve is ensured by the influence of a safety valve.

* * * * *